Feb. 26, 1952     G. H. BECK ET AL     2,587,025
WORK CLAMP
Filed April 28, 1949
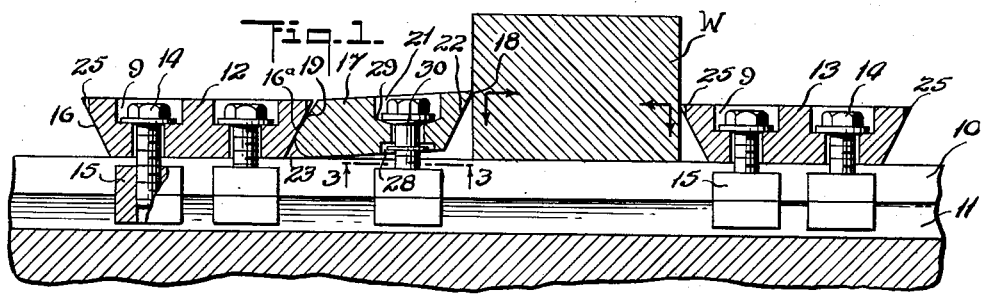
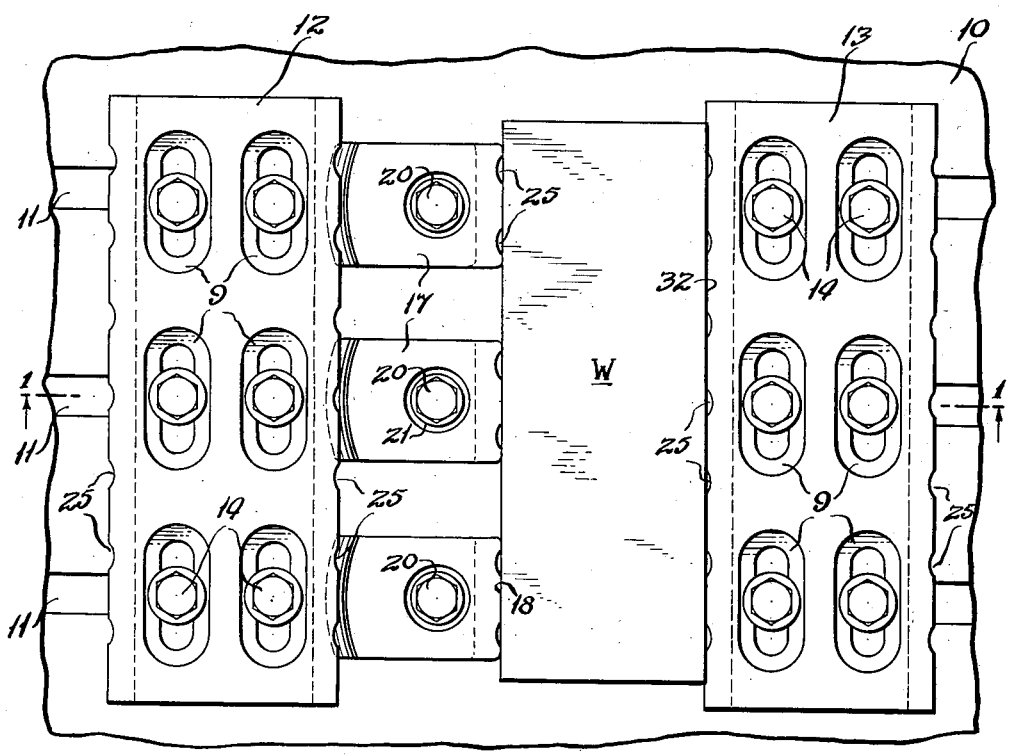
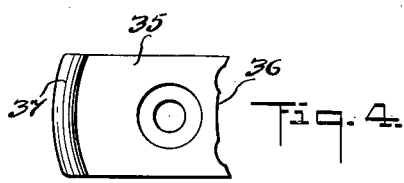
INVENTORS
George H. Beck and
Julius Z. Iorio
BY
P. Stephen Baker
ATTORNEY Patented Feb. 26, 1952

2,587,025

UNITED STATES PATENT OFFICE 2,587,025

WORK CLAMP

George H. Beck, Maplewood, and Julius Z. Foris, Union, N. J.

Application April 28, 1949, Serial No. 90,174

5 Claims. (Cl. 90—61)

This invention relates to work clamps, and more particularly to clamping apparatus for work tables on machines such as lathes, shapers, milling machines, or similar machine tools. The device replaces conventional straps, vises and the like.

Machines of the above nature are generally provided with spaced, parallel, T-grooves or slots whereby the work may be connected to the table of the machine. In accordance with the present invention, one or more clamping members or straps are bolted to the T-slots and arranged so as to engage the work so securely as to maintain it in predetermined and fixed position on the table despite heavy machine loads on the work. The apparatus of the instant invention includes a rocking clamping member or strap which adapts itself to any work regardless of heights, shapes and widths and securely maintains the work on the table by co-acting with abutment walls during its rocking action. Unusually high degrees of biting pressure are accomplished, although the apparatus is simple in construction and operation, such pressure being accomplished through the use of a screw to force a rocking clamp toward the table, the clamp acting as a lever to magnify the pull of this screw and also as a wedge, thereby locking the work on the table. The entire clamping arrangement is very low and allows machining on the face as well as on all four sides of the work.

The invention will be further understood from the following description and drawings in which:

Fig. 1 is a cross-sectional view along lines 1—1 of Fig. 2 apparatus.

Fig. 2 is a top plan view.

Fig. 3 is a section on the lines 3—3 of Fig. 1.

Fig. 4 illustrates a modified clamping member.

Referring now to the drawings in detail, the bed or table 10 of the machine has T-slots 11 formed longitudinally thereof as is conventional. In Fig. 2, a plurality of such T-slots are shown. A pair of blocks or abutments 12 and 13 are secured to the bed 10 as by the bolts 14, the heads of which are nested in the abutment recesses 9 so that the heads are more or less flush with the surface of the abutments. The bolts 14 enter into T-nuts 15 having two or more correspondingly threaded holes, these T-nuts 15 engaging the T-slots in the table. Recesses 9 are shown as elongated in order to permit abutments 12 and 13 to be set at an angle to T-slots 11. Abutment 12 has its side wall 16 inclined inwardly, its opposite wall 16a having a reverse inclination so that the abutment is trapezoidal in cross section. Either side wall may be used as the clamp abutment as hereinafter explained.

The work W is placed between a rocking clamp or strap 17 and block 13 and will be initially positioned at about right angles to the T-slots of the table. The biting edge or "toe" 18 of clamp 17 is held slightly above the table and block 12 is slid over to engage substantially arcuate side wall 19 of the clamp 17. The inclination of the straight side walls form sharp edges at the top thereof, which, in the case of block 13 and clamp 17 bite into the work W, as will be hereinafter explained. Each block may be of a length so that it covers and is duly secured to one or more T-slots as illustrated in Fig. 2.

More than one movable rocking clamp 17 may be employed as illustrated in Fig. 2 and each clamp 17 is likewise secured to the slot 11 by a bolt 20. A recess 21 is formed in clamp 17, which recess is larger than the shank and head of bolt 20, so that the clamp 17 may have rocking movement, as hereinafter described, without interfering with the tightening effect of the bolt 20. Clamp 17 has the inner side wall 22 thereof inclined so as to be generally parallel to wall 16a. It will be evident that said parallelism is only approximate by virtue of the movability of clamp 17. The opposite wall 19 of clamp 17 is substantially arcuate, as aforesaid, as is its bottom corner 23. By this expedient the clamp 17 is permitted to rock in respect to the bed 10 while wall 19 thereof maintains a contact with inclined wall 16a and rounded corner 23 wedges therein.

Side wall 19 of clamp 17 is also transversely arcuate in order that it may solidly meet abutment wall 16a under varying degrees of placement as when abutment 12 is horizontally inclined relative thereto. Edge 18 thereof is formed with notches 25 in order to provide better transverse gripping of the work. It will be observed that abutments 12 and 13 are formed with similar notches. This is for the purpose of gripping the other side of the work and both abutments are so formed because they are interchangeable and either side may be used.

Bolt 20 may be formed somewhat differently from the bolts 14 which secure the abutments to the table. Thus, bolt 20 has an annular groove 26 formed therein into which is snapped a U-shaped retainer 27 as illustrated in Fig. 3. Retainer 27 fits in slot 28 of clamp 17. When bolt 20 is loosened, as when the work W is to be removed as hereinafter set forth, the retainer 27 lifts the clamp 17 and brings its edge 18 away from the work. When the work is removed, the clamp 17 is supported in its raised position by retainer 27 so that the work may be easily re-inserted or a different work slipped in place.

Recess 21 is formed with a concave floor 29 and bolt 20 is spherical on the underside 30 of its head so that the bolt 20 may rock or slide in recess 21 as it is tightened.

The invention is practiced as follows:

Block 13 is usually secured at the limit of work table feed and the work W is disposed against this block. Movable block or clamp 17 will be applied as illustrated in Fig. 1 with its biting edge 18 slightly raised and the stationary block 12 will be moved inwardly and tightened so as to maintain clamp 17 in a slightly upwardly oriented position with the biting edge 18 thereof effecting contact with the other side of the work W. Bolts 20 will then be tightened by rotating with a suitable wrench. The wrench will be hexagonal in the form shown but if the bolt head is of the socket type, a socket wrench will be employed. Wall 19 of the clamp will then rock against side 16a and the table. During this action, the biting edge 18 securely grips the work W applying both downward and outward force, as illustrated by the component force arrows. Thus, the work is maintained between the edge 18 of movable clamp 17 and sharp edge 32 of the stationary clamp 13. It will be observed that the entire upper surface of work as well as that portion of the sides above and between the clamps are free for machining.

The clamping force exerted by the apparatus may be likened to that of a vise in firmly embracing the work and of a hold down clamp by virtue of the downward force of the biting edges 18 and 32. Thus, the apparatus produces a thrust parallel to the work table such as is exerted by conventional vises and simultaneously produces a thrust towards the work table such as is exerted by conventional clamps. In unclamping the work, abutment 12 is first loosened and slid back and the clamping member 17 may then be slid away from the work and the work is thus released.

In Fig. 4 is illustrated a modified clamping member or strap 35 which may take various forms other than those specifically set forth. Clamping member 35 differs from the first described clamp in that its wall 36 is transversely arcuate and substantially parallel to or concentric with its rear wall 37 which corresponds to wall 19 of the first embodiment. Accordingly, work having a rounded exterior can be accommodated, the other components operating as hereinabove described. Wall 36, it will be observed, may be varied so as to best fit the work in process.

What is claimed is:

1. Apparatus for clamping work on a machine table having work connecting T slots formed therein, said apparatus comprising a pair of abutments for stationary disposition at spaced portions of the table, the inner wall of said abutments being inclined downwardly away from the work piece to the table, and a movable clamp for disposition between one of said abutments and the work piece, said clamp having a wall which is arcuate in vertical cross-section and adapted to rock vertically against the inclined inner wall of one of said abutments, the opposite wall of said clamp having a sharp edge, said rocking action bringing said sharp edge away from or toward the work piece so as to release or clamp the same.

2. Apparatus according to claim 1, and wherein said movable clamp has a lower edge which is rounded in vertical cross-section and which communicates with its arcuate wall so as to permit rocking on and in respect to said table.

3. Apparatus according to claim 2, and including a T-shaped slot formed in said movable clamp and a bolt and nut disposed within said T-shaped slot and adapted to be secured at an end thereof to a T slot formed in said table so as to draw said movable clamp thereagainst, said T-shaped slot being of substantially larger dimensions than said bolt and nut so as to permit rocking action of said movable clamp while maintaining a grip thereon by said bolt and nut.

4. Apparatus for clamping work on a machine table comprising a pair of abutments for stationary disposition at spaced portions of the table, the inner wall of said abutments being inclined downwardly away from the work to the table, and a rocking clamp for clamping disposition between one of said abutments and the work said rocking clamp having a sharp upper edge formed with a plurality of notches for clamping the work more securely and having a rear wall which is arcuate in vertical cross-section for vertically rocking against said one abutment, said abutments having a plurality of openings formed therethrough for receiving a bolt to be connected to the table, said openings being elongated whereby said abutments may be horizontally inclined on said table while being secured thereto.

5. Apparatus for clamping work on a machine table comprising a pair of abutments for stationary disposition at spaced portions of the table, the inner wall of said abutments being inclined downwardly away from the work to the table, and a rocking clamp for clamping disposition between one of said abutments and the work, said clamp having an opening formed therethrough and a bolt having a head and shank receivable in said opening for securing the clamp to the table, and a U-shaped member embracing the shank of said bolt, the lower portion of said opening being substantially larger than said shank and embracing said U-shaped member, a shoulder formed in said opening above said U-shaped member for narrowing the opening to less than the width of said U-shaped member whereby raising of said bolt for disengaging the clamp from the table causes said U-shaped member to lift the clamp.

GEORGE H. BECK.
JULIUS Z. FORIS.

REFERENCES CITED

The following references are of record in the file of this patent:

UNITED STATES PATENTS

| Number | Name | Date |
| --- | --- | --- |
| 235,469 | Stephens | Dec. 14, 1880 |
| 895,401 | Hamilton et al. | Aug. 4, 1908 |
| 1,060,980 | Hammann | May 6, 1913 |
| 1,751,329 | Hancock | Mar. 18, 1930 |
| 1,788,652 | Andrew et al. | Jan. 13, 1931 |